UNITED STATES PATENT OFFICE.

WILLIAM C. MARSHALL, OF NEW YORK, N. Y., ASSIGNOR TO ARTHUR A. LIBBY, OF CHICAGO, ILLINOIS.

IMPROVEMENT IN PROCESSES FOR PRESERVING MEATS.

Specification forming part of Letters Patent No. 43,516, dated July 12, 1864; reissue No. 6,451, dated May 25, 1875; application filed May 19, 1875.

DIVISION A.

*To all whom it may concern:*

Be it known that I, W. C. MARSHALL, of the city, county, and State of New York, have invented a new and Improved Process for Preserving Meats; and I do hereby declare that the following is a full, clear, and exact description thereof, which will enable others skilled in the art to carry out and use the same.

This part of my invention consists in exposing the meat to be preserved, after it has been subjected to a partial preserving process, and before it is put up in packages or boxes, to a heavy pressure, by any suitable means or apparatus, in such a manner that a large percentage of the water and a large part of the air contained between the various pieces and in the pores of the meat are expelled before the meat is put up in packages, by which means the principal agents of putrefaction are removed and the bulk considerably reduced.

Any desired quantity of meat may be compressed to agree with the size of the packages, and such compressed meat, being non-elastic, readily retains its bulk and solid form, and can then easily be forced, by any desirable pressure, into the package without exposing the latter to any undue strain or pressure.

The ordinary method of preserving meat for commercial purposes is substantially as follows: The meat, being first subjected to the action of salt and saltpeter in the form of brine, until the water of the meat is saturated, is then removed from the brine and placed in packages of wood with an entirely new solution of salt and saltpeter. This process is known to be destructive of all, or nearly all, the nutritious values of the meat in a very short space of time.

My process is as follows: After rendering the water of the meat—which is the chief agent in destruction—temporarily proof against putrefaction by any of the ordinary processes, by which I remove a large percentage of the water, the remainder being charged with the concentrated antiseptics, I then subject a given quantity of the meat to pressure in a suitable mold, and subsequently into the packages or boxes intended to contain the same, until the air is driven out and the space occupied by the meat agrees with the size of the package or box it is intended to fill. When the compressed meat is in its place the package or box is hermetically sealed, the air remaining in the same being expelled by the usual process in canning. In this state, retaining all its nutritious qualities, the meat will remain perfect as long as the package remains intact.

The advantages of this process are, first, that the natural values of the meat are not destroyed by the means of protecting it from putrefaction, as is unavoidable in the ordinary process; second, that only about one-half the space and weight ordinarily required is necessary by this mode for the same quantity of meat.

Having thus fully described my invention, what I claim as new, and desire to secure by Letters Patent, is—

1. The process herein described for packing and preserving meats, the same consisting in subjecting the meat, after it has been exposed to preserving processes, as described, to a heavy pressure and packing, and hermetically sealing the so compressed meat in packages or boxes, substantially as and for the purpose herein set forth.

2. As a new article of manufacture, the above-described compressed meat, preserved in solid form, without disintegration or desiccation, in hermetically-sealed packages, substantially as herein set forth.

W. C. MARSHALL.

Witnesses:

E. N. HORSFORD,

J. VAN SANTVOORD.